March 31, 1970 K. W. JONES 3,503,309
FLOATING COMBS FOR SCRAP STRIPPING DEVICE
Filed June 14, 1968
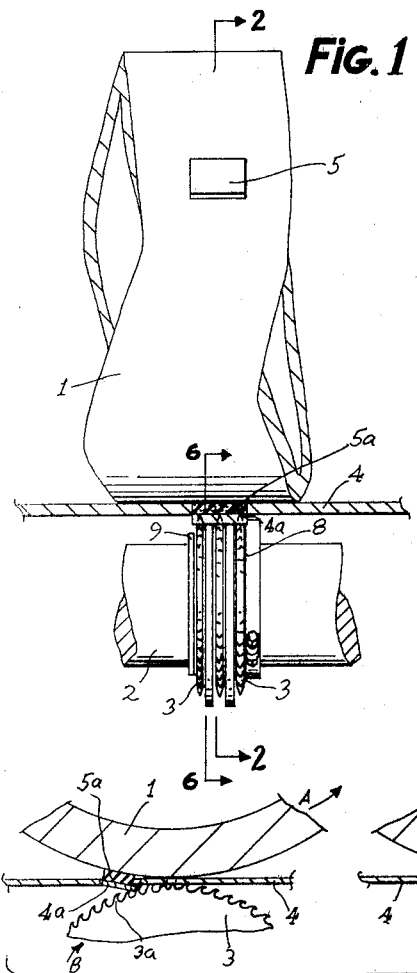
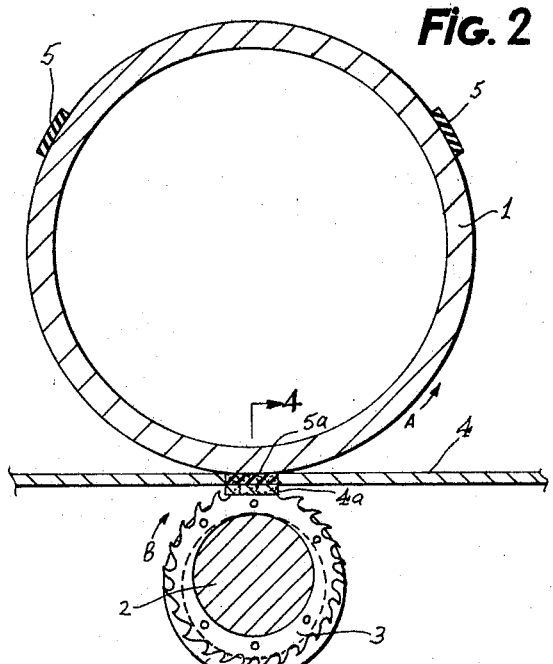
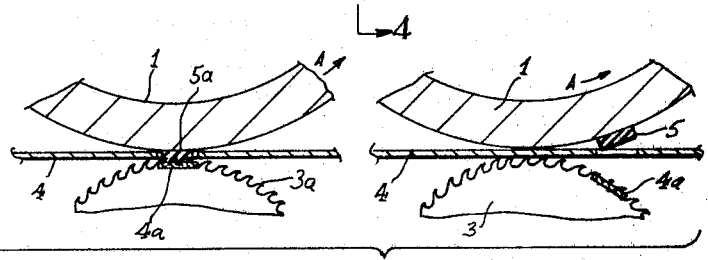
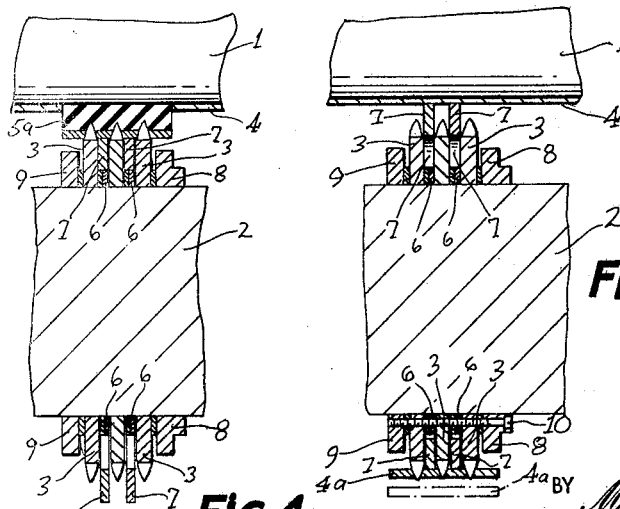
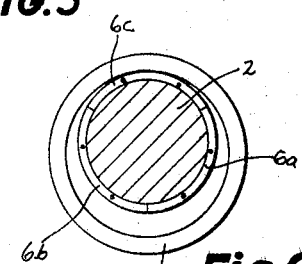
INVENTOR/S
KENNETH W. JONES
BY *Melville, Strasser, Foster and Hoffman*
ATTORNEYS United States Patent Office 3,503,309
Patented Mar. 31, 1970

3,503,309
FLOATING COMBS FOR SCRAP STRIPPING DEVICE
Kenneth W. Jones, 1713 Jackson Lane,
Middletown, Ohio 45042
Filed June 14, 1968, Ser. No. 737,050
Int. Cl. B31b 3/74
U.S. Cl. 93—36                     5 Claims

ABSTRACT OF THE DISCLOSURE

Floating combs for use in a scrap stripping device wherein paperboard or similar sheet materials having scrap areas to be removed are advanced in a path of travel between an overlying timing wheel mounting adjustable pads which contact the scrap areas of the sheet and deflect them downwardly into engagement with one or more rotating stripping discs mounted on a common shaft and provided throughout their peripheries with continuous sets of teeth, the combs being in the form of annular discs loosely fitted on the common shaft adjacent the stripping discs and of a size such that when a piece of scrap is engaged by the teeth on the stripping discs and the discs rotated to carry the scrap downwardly, the annular combs will be displaced upwardly by the scrap for contact by the overlying timing wheel which will deflect the annular combs downwardly beyond the outermost edges of the scrap engaging teeth to thereby remove the scrap areas from the teeth.

BACKGROUND OF THE INVENTION

This invention relates to scrap stripping mechanism of the type disclosed in U.S. Patent 3,266,388 dated Aug. 16, 1966, and has to do more particularly with the provision of improved stripping combs which will remove the scrap areas which have been impaled on the teeth of the stripping discs. In accordance with the teachings of the aforementioned patent, each of the stripping discs is positioned between a pair of side plates the undersurfaces of which extended beyond the periphery of the disc and hence will be contacted by the scrap as the disc continues to rotate, the bottom edges of the plates thus serving to strip the scrap from the teeth. Such arrangment, while generally effective, has nonetheless posed problems in that the scrap areas, particularly if they are small, may fold relative to the side plates and hence pass between the plates with the scrap areas still impaled on the teeth. While the scrap areas will ultimately be disengaged from the teeth, over a period of time a number of the scrap areas will wedge between the plates and ultimately foul the mechanism.

Other forms of scrap removing devices, such as conventional combs having fingers lying on opposite sides of the stripping discs suffer from the same infirmities, together with the additional possibilities of breaking the fingers or bending them out of shape.

The present invention overcomes the foregoing difficulties by providing floating annular combs which insure positive removal of the scrap areas during each revolution of the toothed stripping discs.

RÉSUMÉ OF THE INVENTION

In accordance with the invention, one or more toothed stripping discs are mounted for rotation on a common shaft in spaced apart relation, the stripping discs coacting with an overlying timing wheel or drum mounting pressure pads positioned to contact the areas of the blanks to be scrapped and deflect them downwardly into engagement with the teeth of the underlying stripping discs. It will be understood, of course, that the blanks will be in registry with the stripping mechanism and will be advanced in timed relation to the rotation of the timing wheel so that the pressure pads will make contact with the scrap areas as the blanks pass over the stripping discs.

The floating annular combs are mounted immediately adjacent the stripping discs, usually between adjacent pairs of the stripping discs. The outside diameter of the annular combs will be at least equal to or slightly larger than the diameter of the stripping discs measured to the points of their teeth, and the inside diameter of the annular combs will be sufficiently large so that they will loosely surround the common shaft on which the stripping discs are mounted. When the annular combs are freely hanging, their uppermost edges will lie below the uppermost teeth on the stripping discs and hence when the scrap areas are deflected downwardly by the pads on the timing wheels, the scrap areas will be impaled on the teeth. However, as the stripping discs rotate and carry the scrap areas downwardly, the adjacent edges of the annular combs will react against the scrap areas and the combs will be lifted upwardly so that their then uppermost edges will lie above the then uppermost teeth on the stripping discs and the combs will come into contact with the overlying timing wheel. The timing wheel acts to displace the annular combs downwardly and in so doing causes them to push the scrap areas downwardly and hence remove them from the teeth. Since the outside diameter of the annular combs is at least as great as the outside diameter of the stripping discs, the downward displacement of the annular combs to a position in which their then uppermost edges substantially coincide with the points of the then uppermost teeth on the stripping discs results in the lowermost edges of the annular combs coinciding with or projecting downwardly beyond the points of the teeth on the then lowermost edges of the strippings discs and the impaled scrap areas will have been forced downwardly beyond the teeth where the scrap will fall freely into a collection box or the like.

DESCRIPTION OF THE DRAWINGS

FIGURE 1 is a fragmentary side elevational view illustrating a scrap stripping device in accordance with the invention.

FIGURE 2 is a vertical sectional view taken along the line 2—2 of FIGURE 1.

FIGURE 3 is a fragmentary vertical sectional view illustrating successive stages in the removal of a piece of scrap in accordance with the instant invention.

FIGURE 4 is an enlarged vertical section view taken along the line 4—4 of FIGURE 2 illustrating the position of the annular combs at the time a piece of scrap is impaled on the teeth of the stripping discs.

FIGURE 5 is a vertical sectional view similar to FIGURE 4 illustrating the rotation of the piece of scrap through 180° and the downward displacement of the annular combs to remove the scrap.

FIGURE 6 is a vertical sectional view taken along the line 6—6 of FIGURE 1.

DESCRIPTION OF THE PREFERRED EMBODIMENT

Referring first to FIGURES 1 and 2 of the drawings, a scrap stripping device in accordance with the instant invention comprises a rotatable timing wheel 1 overlying and driven in timed relation to a common shaft 2 which mounts a plurality of toothed stripping discs 3 which rotate with the common shaft. The timing wheel and toothed stripping discs define a pass-line therebetween for the passage of the sheets of boxboard 4 from which designated scrap areas are to be removed. The scrap areas are removed by being contacted and deflected downwardly by pressure pads 5 mounted about the periphery of the timing wheel and positioned to coincide with the scrap areas as the sheets of boxboard are fed between the timing wheel and the underlying stripping discs. Preferably, the pressure pads will be formed from cork or rubber which the points of the teeth may penetrate without damage to the teeth. Alternately, the pads may be composed of brush-like bristles which are sufficiently rigid to displace the scrap areas and yet will readily accept the teeth of the stripping discs.

The stripping action which takes place can be best seen in FIGURE 2 which diagrammatically illustrates successive stages in the stripping operation. Thus, in the left-hand portion of FIGURE 2 the pressure pad 5a is shown making initial contact with the scrap area 4a, the scrap area being deflected downwardly for contact with the teeth 3a of stripping disc 3. The arrows A and B indicate, respectively, the direction of rotation of the timing wheel and the stripping disc. In the center portion of FIGURE 2, the pressure pad 5a has caused the scrap area 4a to be impaled on the teeth 3a, whereupon as rotation of the timing wheel and stripping disc continues, the parts will assume the position illustrated in the right-hand portion of FIGURE 2, with the impaled scrap area 4a being carried downwardly away from the plane of the boxboard sheet for subsequent removal in accordance with the instant invention.

In the exemplary arrangement shown in FIGURES 4 and 5, a series of three toothed stripping discs 3 are mounted on the common shaft 2 in spaced apart relation, being spaced apart by sets of spacers 6 which, as seen in FIGURE 6, may be composed of segments 6a, 6b and 6c. The spacers may be employed in side-by-side pairs between the adjoining stripping discs, and are surrounded by the annular combs 7. The assembly is held together by opposing hubs 8 and 9 joined together by bolts 10 which pass through the spacers and the interposed stripping discs. The annular combs 7 are, however, loosely fitted between the stripping discs and are free to move in a vertical plane relative to the stripping discs and the spacers. The annular combs may be formed from any suitable material, although a preference is expressed for plastics or resinous laminates, such as Formica.

FIGURE 4 illustrates the relative positions of the annular combs when a piece of scrap 4a is impaled upon the teeth of the stripping discs by the pressure pad 5a. It will be noted that the uppermost edges of the annular combs lie below the teeth on the stripping discs while at their lowermost edges the annular combs project downwardly beyond the points of the teeth.

As the parts rotate and the stripping discs carry the impaled scrap area 4a to the bottoms of the discs, the parts assume the position illustrated in FIGURE 5 and the annular combs will have been effectively elevated so that their uppermost edges project upwardly beyond the uppermost ends of the stripping discs and hence are in position to be contacted and deflected downwardly by the timing wheel 1. Such downward deflection will cause the scrap area 4a to be displaced downwardly, in the manner illustrated in dotted lines in FIGURE 5, thereby cleanly stripping it from the teeth of the stripping discs.

It will be understood that the number and location of the stripping discs does not constitute a limitation on the invention and will vary in accordance with the size of the box-board sheets being stripped and the number of scrap areas to be removed. For example, it may be desired to handle sheets or webs having widths of 60 or 70 inches or even more, depending upon the size of the available paperboard stock. Consequently, the stripping discs may be arranged so as to coincide with the various scrap areas to be removed and the pressure pads will be located on the overlying timing wheel in alignment with the various stripping discs or sets of stripping discs, their locations about the periphery of the timing wheel being so chosen that they will contact the scrap areas as the timing wheel rotates in timed relation to the movement of the paperboard sheets. While a preference is also expressed for stripping discs having saw-like teeth about their periphery, stripping discs having other forms of tooth-like projections may be employed. For example, the stripping discs could mount a plurality of pin-like element projecting radially outwardly from the discs on which the scrap areas can be impaled. It is also to be understood that one or more timing wheels may be employed depending upon the axial displacement of the various stripping discs or groups of such discs, or the timing wheel may take the form of a cylindrical drum with the pressure pads secured to the cylindrical surface of the drum.

The embodiments of the invention in which an exclusive property or privilege is claimed are defined as follows:

1. For use in a scrap stripping device wherein a circular stripping disc having tooth-like projections extending radially outwardly therefrom is mounted on a shaft for rotation about the axis of said shaft, an annular stripping comb surrounding said shaft immediately adjacent and in parallel relation to said stripping disc, said annular comb having an outside diameter which is at least as great as the outside diameter of said stripping disc measured from the outermost edges of said tooth-like projections and an inside diameter which is greater than the diameter of said shaft, said annular comb being free for limited movement relative to said stripping disc in a plane paralleling the plane of said stripping disc.

2. The scrap stripping mechanism claimed in claim 1 wherein a plurality of said stripping discs are mounted on said shaft in closely spaced apart relation, and wherein one of said annular combs is positioned between each adjacent pair of said stripping discs.

3. In a device for stripping scrap from a cut and scored paperboard blank wherein the blank to be scrapped is passed between an overlying rotation timing wheel and an underlying rotating circular stripping disc having tooth-like projections extending radially outwardly therefrom, and wherein means are mounted on said timing wheel for contacting and displacing downwardly scrap areas of the blank to impale said scrap areas on the tooth-like projections of said stripping disc, the improvement which comprises an annular stripping comb surrounding the axis of rotation of said stripping disc immediately adjacent and in parallel relation to said stripping disc, said annular comb having an outside diameter which is at least as great as the outside diameter of said stripping disc measured from the outermost edges of said tooth-like projections and mounted for limited movement relative to said stripping disc in a plane paralleling the plane of said stripping disc.

4. The scrap stripping mechanism claimed in claim 3 wherein said stripping disc and said annular comb are mounted on a common shaft, said annular comb having an inside diameter which is greater than the diameter of said common shaft and is loosely received on said shaft.

5. The scrap stripping mechanism claimed in claim 4 wherein a plurality of said stripping discs are mounted on said common shaft in closely spaced apart relation, and wherein one of said annular combs is positioned between each adjacent pair of said stripping discs.

References Cited

UNITED STATES PATENTS 2,932,228   4/1960   German _____ 93—36 XR
3,266,388   8/1966   Jones _____ 93—36

BERNARD STICKNEY, Primary Examiner